(No Model.)

W. V. CRUESS.
Animal Shears.

No. 234,250.  Patented Nov. 9, 1880.

Witnesses:
Geo. H. Strong,
Frank A. Brooks.

Inventor:
William V. Cruess,
By Dewey & Co.,
Attys.

UNITED STATES PATENT OFFICE.

WILLIAM V. CRUESS, OF SAN MARCOS, CALIFORNIA.

ANIMAL-SHEARS.

SPECIFICATION forming part of Letters Patent No. 234,250, dated November 9, 1880.

Application filed August 23, 1880. (No model.)

*To all whom it may concern:*

Be it known that I, WILLIAM V. CRUESS, of San Marcos, county of San Luis Obispo, and State of California, have invented an Improvement in Sheep-Shears; and I hereby declare the following to be a full, clear, and exact description thereof, reference being had to the accompanying drawings.

My invention relates to an improvement in sheep-shears; and it consists in so arranging the spring which keeps the cutting-blades apart so that the said spring is made removable, and springs of greater or less strength may be used to suit different operators, as is more fully described in the accompanying drawings and specification, in which—

Figure 1:
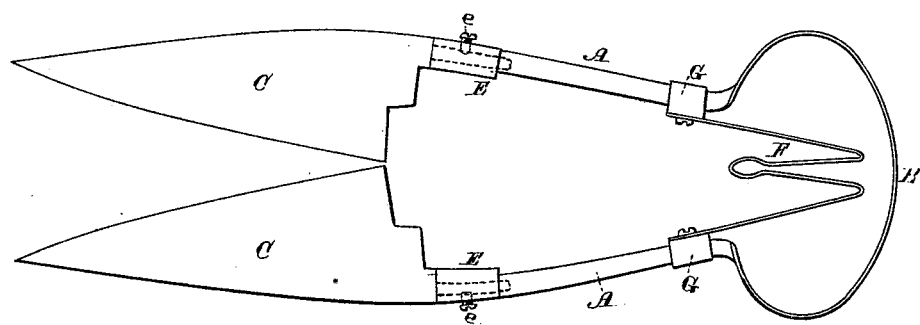
Figure 2:
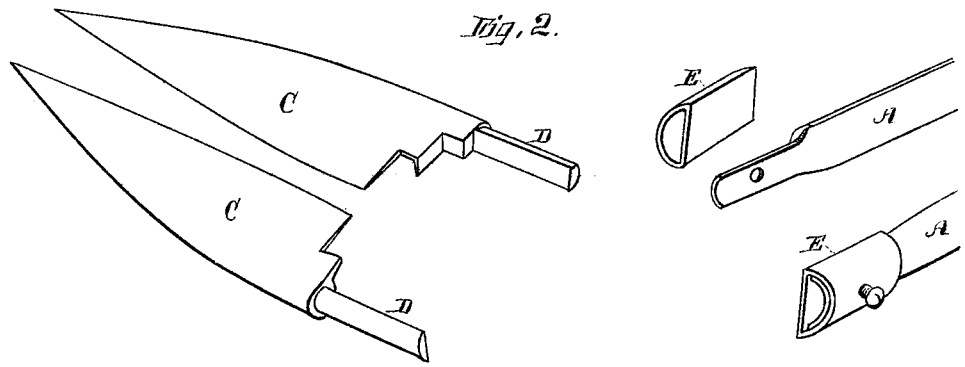
Figure 3:

Figure 1 is a view of my device, and Fig. 2 shows the details of construction. Fig. 3 shows another method of fastening the blades.

In the ordinary sheep-shears the blades form part of the handles, which are connected by a bow, and as frequent grinding is necessary the blades soon become worn down, when the tool is no longer serviceable. The spring which serves to keep the blades and handles separated, except when closed by the operator, also forms part of or is fixedly attached to the handle, and as some operators prefer a stronger or weaker spring, they cannot always be suited. Moreover, as the blades wear down by frequent grinding, the spring has to be more firmly compressed in order to make the blades cut.

In the drawings, A represents the handles, B the bow, and C the removable blades, as shown in Fig. 1. These removable blades have a small shank, D, formed at their upper ends, which fits into the socket E, formed at the lower end of the handles, and a set-screw, e, retains the handles in place or admits of their removal. The sockets E are also made separate from the handles, and are slipped onto them and held in place by a screw going through the socket and handle. The shank on the blade is then slipped into the socket and held in position by the set-screw, as shown.

In some cases I have found it more desirable to form the sockets E with the blades instead of attaching them to the shanks. The shanks D are thus formed upon the handles, as shown at Fig. 3.

The spring F is made in the usual form used in sheep-shears; but the two ends which are ordinarily riveted to the handles have sockets G formed on or attached to them, which are of suitable size to slide over the handles, as shown. By this means, in case a stiffer or weaker spring is desired, one may be removed and another substituted.

By this means springs of varying strengths may be used to suit different operators, and the blades may be removed and others substituted immediately, obviating the necessity of keeping a great many pairs of shears on hand. Moreover the handles may be used for an indefinite length of time, different blades being used as occasion requires.

Having thus described my invention, what I claim as new, and desire to secure by Letters Patent, is—

The spring F, fitted to operate between the handles, in combination with the sliding sleeves G G and handles A A, whereby the spring may be adjusted or changed, substantially as herein described.

In witness whereof I have hereunto set my hand and seal.

WILLIAM V. CRUESS. [L. S.]

Witnesses:
   I. B. DAVIS,
   B. DAVIS.